(12) United States Patent
Obrist

(10) Patent No.: US 10,543,508 B2
(45) Date of Patent: Jan. 28, 2020

(54) PISTON FOR A CARTRIDGE, CARTRIDGE AND METHOD OF VENTING A CARTRIDGE

(71) Applicant: Sulzer Mixpac AG, Haag (CH)

(72) Inventor: Manfred Obrist, Lustenau (AT)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 15/510,947

(22) PCT Filed: Sep. 15, 2015

(86) PCT No.: PCT/EP2015/071128
§ 371 (c)(1),
(2) Date: Mar. 13, 2017

(87) PCT Pub. No.: WO2016/041984
PCT Pub. Date: Mar. 24, 2016

(65) Prior Publication Data
US 2017/0259296 A1    Sep. 14, 2017

(30) Foreign Application Priority Data
Sep. 17, 2014   (EP) ..................................... 14185191

(51) Int. Cl.
*B05C 17/005* (2006.01)
*B29C 45/16* (2006.01)
*B29L 31/00* (2006.01)

(52) U.S. Cl.
CPC .. *B05C 17/00579* (2013.01); *B05C 17/00553* (2013.01); *B29C 45/16* (2013.01); *B29L 2031/7494* (2013.01)

(58) Field of Classification Search
CPC ............ B65D 83/0005; B65D 2205/04; B05C 17/00576; B05C 17/00579; B05C 17/00553
USPC ................................. 222/326, 327, 286, 387
See application file for complete search history.

(56) References Cited

U.S. PATENT DOCUMENTS

| | | | | |
|---|---|---|---|---|
| 4,134,523 A | * | 1/1979 | Hansen | B05C 17/00579 138/42 |
| 4,854,484 A | * | 8/1989 | Gentile | B05B 11/00416 222/256 |
| 4,854,485 A | | 8/1989 | Collins | |
| 5,150,823 A | * | 9/1992 | Sugita | B05B 11/0056 222/386 |
| 5,316,186 A | * | 5/1994 | Prestele | B65D 83/0005 222/327 |
| 5,400,926 A | * | 3/1995 | Keller | B05C 17/00579 222/327 |

(Continued)

FOREIGN PATENT DOCUMENTS

| | | |
|---|---|---|
| EP | 1845033 A1 | 10/2007 |
| WO | 01/55006 A1 | 8/2001 |

*Primary Examiner* — Charles Cheyney
(74) *Attorney, Agent, or Firm* — Global IP Counselors, LLP

(57) ABSTRACT

A piston for a cartridge has a medium side and an actuation side, and includes a piston body, a piston cover arranged adjacent to at least a part of the piston body and a valve arranged within the piston body and adjacent to the piston cover, the piston body including a centering portion arranged at an outer region of an outer peripheral surface thereof. The centering portion including at least one venting device.

24 Claims, 5 Drawing Sheets

(56) References Cited

U.S. PATENT DOCUMENTS

| | | | | |
|---|---|---|---|---|
| 6,090,077 | A * | 7/2000 | Shaw | A61M 5/3234 604/110 |
| 6,598,766 | B1 * | 7/2003 | Brugner | B05C 17/00576 222/326 |
| 7,351,224 | B1 * | 4/2008 | Shaw | A61M 5/3234 604/110 |
| 7,621,428 | B2 * | 11/2009 | Springhorn | B05C 17/00576 222/326 |
| 7,748,577 | B2 * | 7/2010 | Brugner | B05C 17/00576 222/326 |
| 8,505,785 | B2 * | 8/2013 | Helmenstein | B05C 17/00576 222/326 |
| 9,144,821 | B2 * | 9/2015 | Obrist | B05B 11/02 |
| 9,242,784 | B2 * | 1/2016 | Buck | B05C 17/00553 |
| 9,469,061 | B2 * | 10/2016 | Frey | B65D 83/005 |
| 9,797,511 | B2 * | 10/2017 | Bublewitz | F16J 1/00 |
| 2005/0029306 | A1 * | 2/2005 | Brennan | B05C 17/00576 222/327 |
| 2005/0066809 | A1 * | 3/2005 | Nehren | B05C 17/00576 91/422 |
| 2010/0147896 | A1 | 6/2010 | Obrist | |
| 2010/0200617 | A1 * | 8/2010 | Schar | B05C 17/00579 222/387 |
| 2011/0089200 | A1 | 4/2011 | Reuter | |
| 2012/0061424 | A1 * | 3/2012 | Obrist | B05C 17/00579 222/387 |
| 2012/0247323 | A1 | 10/2012 | Obrist | |
| 2016/0288159 | A1 * | 10/2016 | Seifer | B05C 17/00553 |

* cited by examiner

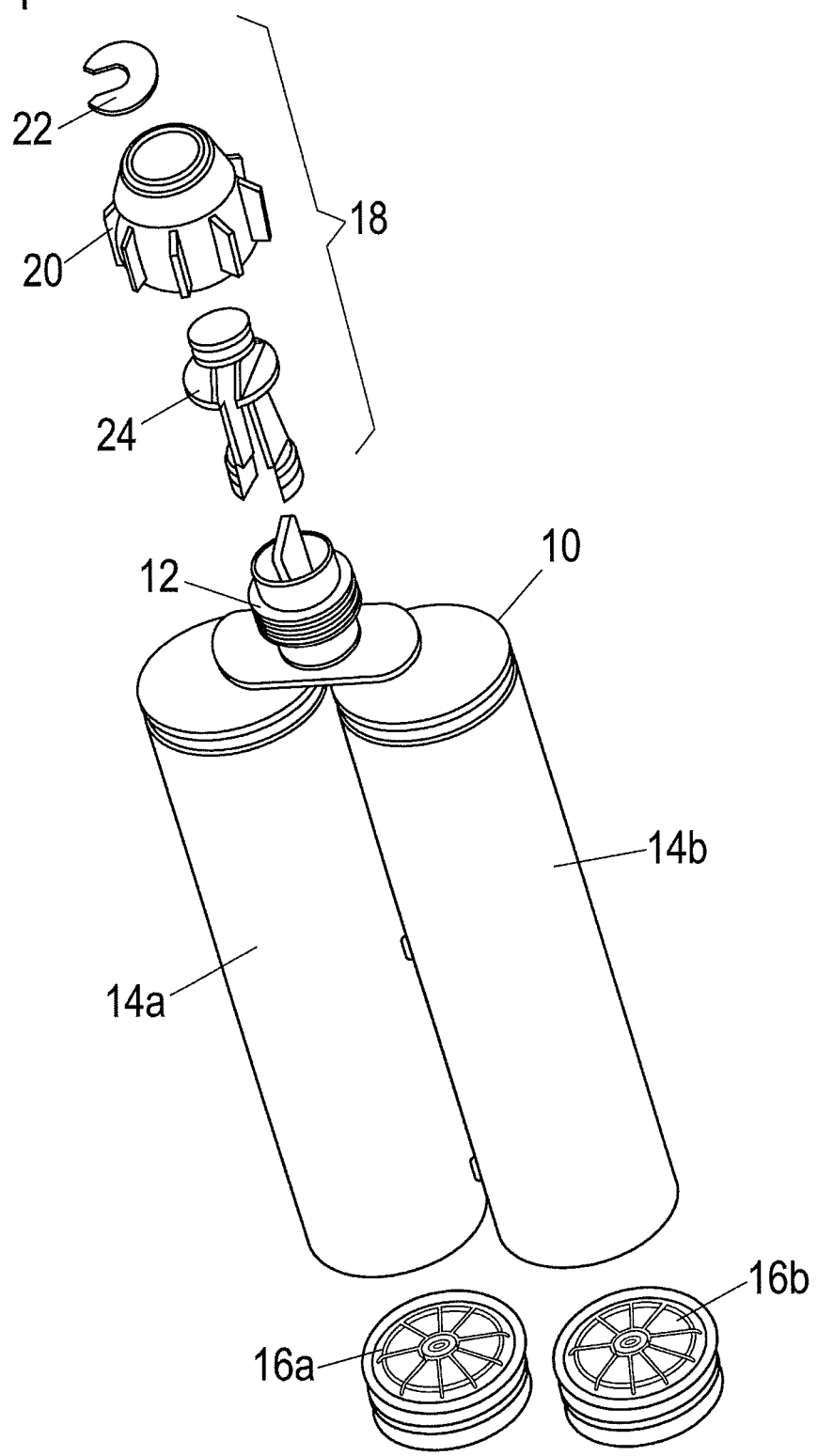

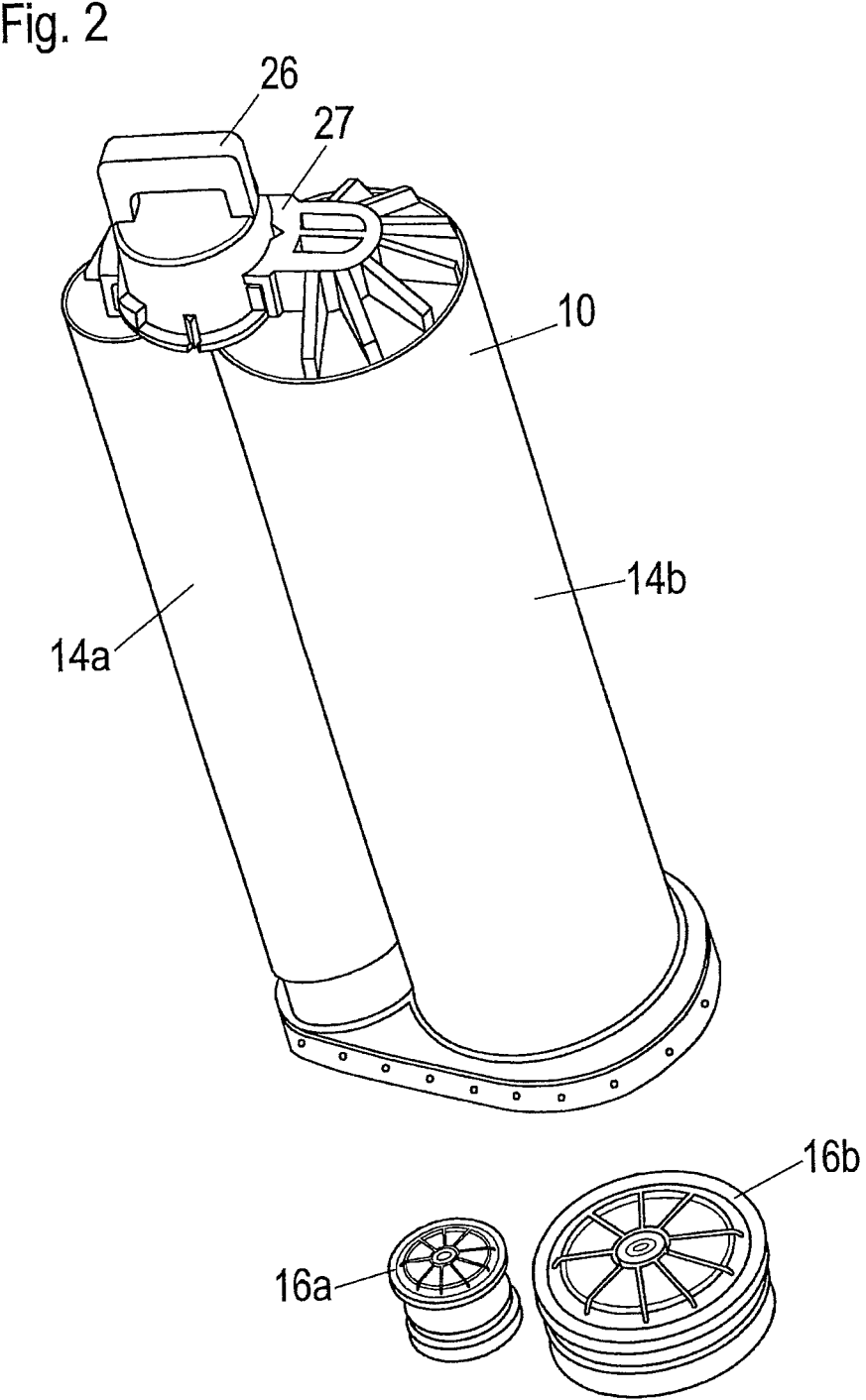

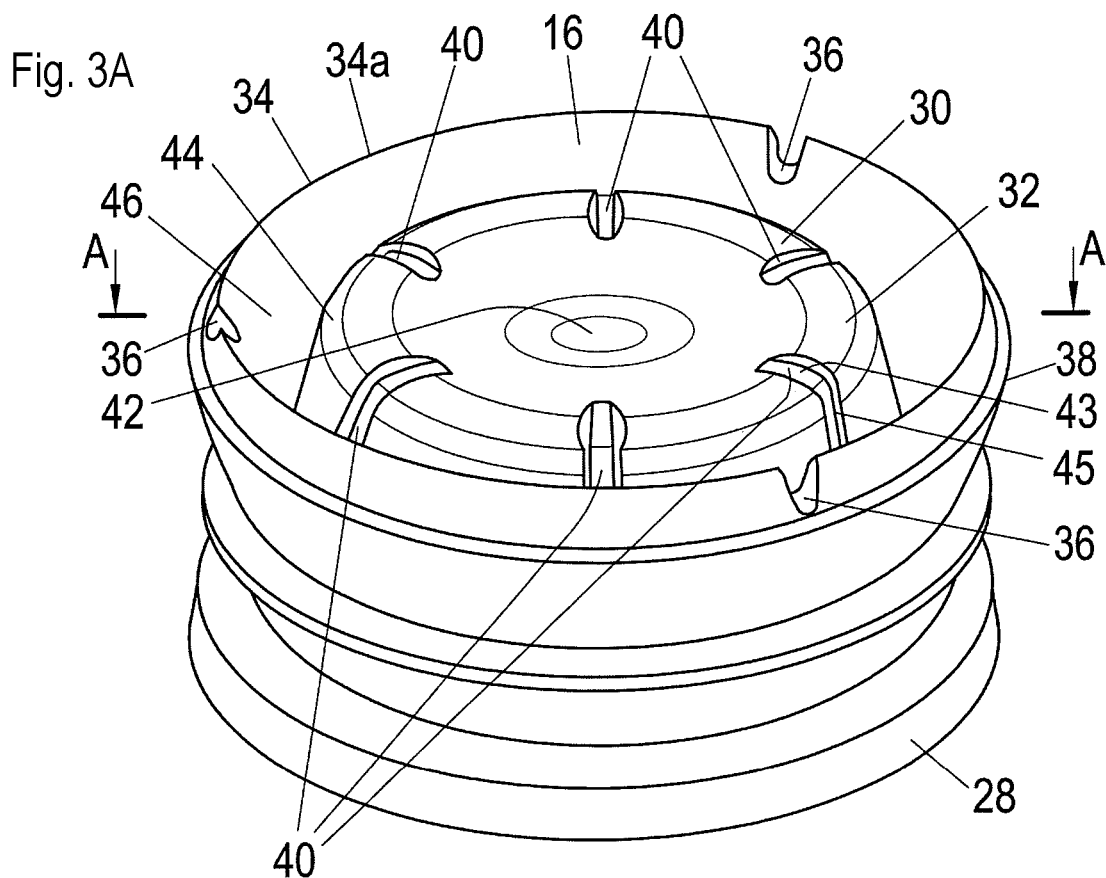
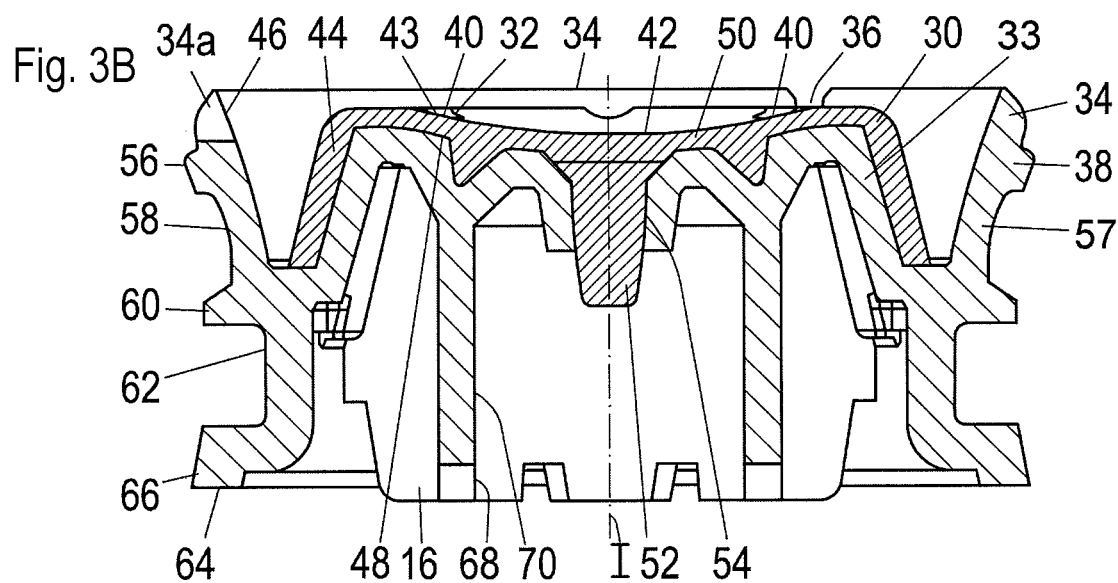

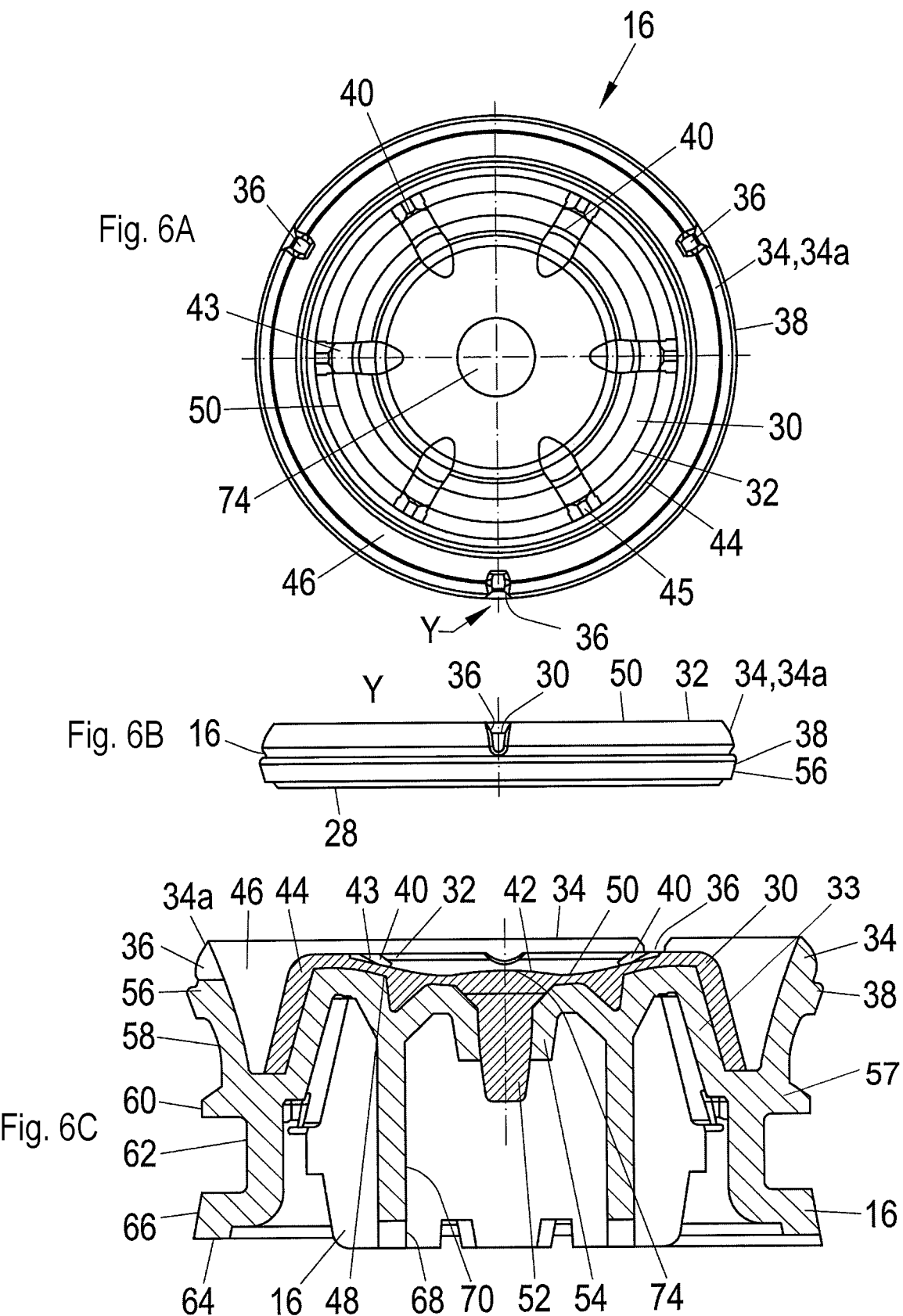

PISTON FOR A CARTRIDGE, CARTRIDGE AND METHOD OF VENTING A CARTRIDGE

CROSS-REFERENCE TO RELATED APPLICATIONS

This application is a U.S. National Stage application of International Application No. PCT/EP2015/071128, filed Sep. 15, 2015, which claims priority to EP Application No. 14185191.5, filed Sep. 17, 2014 the contents of each of which are hereby incorporated herein by reference.

BACKGROUND

Field of Invention

The present invention relates to a piston for a cartridge, to a cartridge and to a method of venting a cartridge.

Background Information

A wide variety of ways of dispensing masses from cartridges is known in the prior art. The masses can be a so-called one-component mass, this means single component materials that, e.g. harden via a chemical reaction which is brought about either by an external energy source, such as UV light or heat, or e.g. due to moisture etc., present in the surroundings of the position of application. Typical applications of one component materials can be found e.g. in the dental field or in the building industry, for example to bond products such as windows and concrete elements, or to provide seals between different components.

Another known type of mass is a multi-component mass. The materials to be dispensed are typically a matrix material and a hardener. The filled cartridges come in different ratios referred to as 1:1, 2:1, 4:1 and 10:1 etc., the numbers specifying the ratios of the amounts of each of the two materials that are to be dispensed. The reason for these different ratios is to allow a wide variety of different compositions to be mixed and dispensed. For example some compositions require more hardener and some require less hardener. Also some compositions require more mixing. Mixing tips are known from the prior art which are adapted to mix the compositions as they exit the cartridge.

SUMMARY

Two-component materials are typically used as impression materials, e.g. on the formation of dental impressions, as a cement material for prosthetic restorations, as a temporary cement for trial cementing restorations or for cementing temporary crowns. Further applications of two-component materials are in the building industry where they are e.g. used as a replacement for mechanical joints that corrode over time. Adhesive bonding can be used to bond products such as windows and concrete elements. The use of multi-component protective coatings, for example moisture barriers, corrosion protection and anti-slip coatings, is also becoming increasingly common. Examples of flowable materials which can be used are, for example, distributed by the company Coltene using the tradename AFFINIS® or by the company DMG using the tradename PermaCem.

One-component and multi-component materials are frequently very expensive and thus it is desired to increase the storage life of these materials, particularly if the cartridges and the materials are designed not just for a single use, but such that they can be used a multiple amount of times over considerable periods of time of e.g. days, weeks or even months.

In order to increase the storage time of the components, the cartridges to be filled have to be made from materials which do not react with the masses stored therein. Moreover, the cartridges have to be clean, i.e. they should not include any water residue etc., in particular in connection with the storage of single component masses. On filling the cartridges, the cartridges are typically filled either via their outlet with the piston already being positioned in the cartridge or the cartridge is filled from the end where the piston is normally received before the installation of the piston.

In both cases air can be trapped between the piston and the material to be stored therein. This air can lead to a reaction of the materials present in the cartridge and hence reduce the storage life of the materials present in the cartridge.

Thus it is an object of the invention to provide a cartridge which facilitates an improved storage lifetime of a cartridge once filled with a component. It is a further object of the present invention to provide a piston which facilitates the venting of air present from a cartridge.

The piston in accordance with the invention thus has a medium side and an actuation side and the piston further comprises a piston body, preferably having an at least substantially cylindrical outer shape, a piston cover arranged adjacent to at least a part of the piston body and a valve arranged within the piston body and adjacent to the piston cover, the piston body comprising a centering portion arranged at an outer region of an outer peripheral surface thereof, wherein the centering portion comprises at least one venting device.

The centering portion advantageously facilitates the installation of the piston in a cartridge which reduces the time required for installation and also the amount of problems which can be encountered during the combination of a piston with a cartridge.

Furthermore, the centering portion can act as a scraper during the use of the cartridge. This is because the centering portion can scrape a mass and in particular particles present in the mass from the cartridge wall as the piston travels along the cartridge wall during a dispensing and/or venting process.

Moreover, the venting device reduces the amount of air entrapped between a cartridge wall and the centering portion on inserting the piston into the cartridge, thereby, the cartridge comprising a flowable mass comes into contact with fewer contaminants during the piston insertion.

Moreover, the venting device at the centering portion improves the air removal from an assembled cartridge, since a space formed between the cartridge wall and the centering portion, in which air can be trapped, can now be vented.

In this connection it should be noted that the piston body is considered as a part which generally defines the shape and size of a piston.

In a preferred embodiment the centering portion comprises at least one of a chamfered lip and a circumferentially extending inclined surface.

A centering portion having one of a, preferably circumferentially extending, chamfered lip and a circumferentially extending inclined surface facilitate the ease of insertion of the piston into a cartridge by automatically centering the piston within an inlet opening of the cartridge during the piston insertion. Moreover, a chamfered lip and/or a circumferentially extending inclined surface pointing towards a longitudinal axis of the piston avoids a cartridge wall from becoming damaged on an insertion of a piston into the cartridge, as the piston can be guided into the cartridge without becoming skew with respect to the cartridge wall.

It is preferred if the at least one venting device comprises a slot, a groove and/or an aperture. Such venting device can easily be produced in an injection molded process during the fabrication of the piston body. Moreover, such venting device reliably ensures venting of the air entrapped between the centering portion and a cartridge wall.

Advantageously at least two, preferably three, venting devices are distributed at the centering portion, wherein the at least two venting devices are preferably distributed at regular intervals around the outer peripheral surface.

Providing at least two venting devices ensures that a space between a cartridge wall and the piston is uniformly vented during e.g. the piston insertion into a cartridge. Distributing the venting devices at regular intervals around the outer peripheral surface ensures that the venting takes place in a uniform manner along the outer peripheral surface and in particular from the space between the cartridge wall and the centering portion.

Advantageously the at least one venting device is in communication with the valve in a venting state of the piston, preferably in gas flow communication, in particular such that a venting takes place between the medium side and the actuation side via the at least one venting device and the valve.

In this connection communication means, that a gas e.g. air present on one side of the venting means can flow from that one side of the venting device via the venting device towards the valve. Thereby e.g. air can be removed via the venting device and the valve from the medium side of the piston.

Advantageously the centering portion is arranged at an outer part of the piston body and has a wall inclined towards a longitudinal axis of the piston. In this respect the inclined wall acts as an introduction device of the centering portion to facilitate the introduction of the piston into a corresponding cartridge.

It is preferred when the centering portion is arranged at an outer wall of the piston body, with the outer wall preferably defining the outer peripheral surface of the piston.

Providing the centering portion at an outer wall of the piston means that the piston can be centered via its outer wall as it is inserted into a corresponding cartridge. This advantageously aids the introduction of the piston into the cartridge.

Advantageously the at least one venting device extends through the outer wall in the region of the centering portion towards an inner wall of the piston, with the at least one venting device in particular being disposed in the region of the centering portion comprising at least one of a chamfered lip and a circumferentially extending inclined surface.

In this respect it is preferred if the at least one venting device permits a flow communication of air present at the outer peripheral surface of the outer wall towards the inner wall and preferably towards the valve arranged within the piston body such that the flow communication takes place from the outer peripheral surface via the outer wall, the inner wall and the valve, in order to transport gas e.g. air from the medium side of the piston to the actuation side. Thereby a storage life of a component stored in a filled cartridge can be extended as significantly less air is subsequently present in a filled cartridge.

Providing the venting devices such that they extend through the outer wall enables a simple manufacture thereof.

Preferably the at least one venting device(s) is/are arranged adjacent to a sealing lip which is a part of the outer wall, with the at least one venting device preferably having the form of a generally U-shaped or V-shaped valley in a cross-section thereof. Arranging the venting device adjacent to the sealing lip is one of the design possibilities that is simple in its manufacture, as it does not require complex mold designs for the tools typically employed in injection molding.

In a very preferred embodiment the at least one sealing element is provided in the at least one chamfered lip respectively in the circumferentially extending inclined surface with the at least one chamfered lip respectively the circumferentially extending inclined surface being arranged adjacent to the sealing lip.

This is a preferred design of the centering portion comprising the at least one venting device.

It is preferred if the outer wall of the piston comprises at least one of the following members selected from the group comprising: at least one sealing device, the centering portion, at least one projection, at least one recess, a chamfered lip and the at least one venting device. Such members can be provided to facilitate the entry of the piston into a cartridge, with e.g. the projections acting as stabilizers to guide the piston in the cartridge and the recesses acting so as to reduce a friction between the cartridge inner wall and the piston outer wall, so that the piston can be moved swiftly along the cartridge wall.

Advantageously the inner wall of the piston is arranged adjacent to the piston cover and a recess that in turn is adjacent to the outer wall.

The outer wall and the inner wall have a space formed therebetween, the piston recess into which a part of the piston cover extends. In this connection it is preferred if the inner wall is a support for the piston cover.

Preferably the piston cover comprises a venting pin that forms part of the valve, with the venting pin preferably being able to be moved together with the piston cover relative to the piston body during a venting process. This is a beneficial design of the valve of the piston in accordance with the invention.

It is preferred when the piston cover comprises a concavely shaped central region and a side portion.

It is further preferred when the side portion extends into a recess of the piston body and the recess is arranged adjacent to the centering portion. This is beneficial if the piston cover is produced in an injection molded process, as this shape can easily be produced in such a process.

It is further preferred when a side of the piston cover remote from the concavely shaped central region is adapted to the shape of the side of the piston body arranged adjacent to the piston cover. Thereby a piston body can advantageously be used as part of a mold for the piston cover during the manufacturing process of the piston.

In this connection it should be noted that the piston and the piston cover can both be formed during an injection molded process. During a first step of this process the piston body is made in a mold and from a first type of material. Following this step the piston cover can be produced at the piston body using the side of the piston body that will subsequently be adjacent to the piston cover as a part of the mold for the formation of the piston cover from a second type of material during the formation of the piston cover directly at the piston body. This means that the piston comprises two parts which are respectively formed in an injection molded process to form a so-called two component injection molded piston.

It is further preferred when the piston cover is arranged to cover at least a substantial part of an end of the piston with the piston cover being arranged adjacent to the centering portion such that the centering portion preferably surrounds the piston cover.

Providing the piston cover such that it covers at least a substantial part of an end of the piston allows the piston cover to protect at least a substantial part of the piston body so that this does not come into contact with the component stored in the cartridge. Moreover, it also ensures that the valve present between the piston body and the piston cover cannot become blocked during the use of a cartridge.

In a further embodiment of the piston, the piston cover comprises further a venting device which extends over a length of the side portion arranged adjacent to the concavely shaped central region and which project into and preferably towards the concavely shaped central region as the first channel, with a length of the first channel being larger than a width of the side portion.

Providing further a venting device at the piston cover ensures that an amount of air entrapped between the flowable mass and the concavely shaped central region can be reduced during the piston insertion, as the air is typically trapped in the space provided by the concavely shaped central region. Moreover, providing a venting device having a length which is selected such that it projects into the concavely shaped central region means that the air present in this central region can also be vented.

In this connection it should be noted that the piston cover is typically deflected during a venting process of the piston, such that a curvature of the concavely shaped central portion is reduced or even inverted such that the concave region becomes convex in use. Thus, any air previously present in the concavely shaped region can simply be vented from the concavely shaped central region on a venting of the cartridge, as a base of the further venting device then lies beneath a base of the then deformed concavely shaped central region.

Advantageously the further venting device comprises a venting groove, a venting slot and/or a venting aperture; and/or wherein at least two further venting devices are distributed at the piston cover, wherein the at least two further venting devices are preferably distributed at regular intervals over a surface of the side portion.

The design of the further venting devices mentioned above, facilitates the manufacture of the piston cover and also reliably ensures a good venting of air present therein.

Advantageously the venting grooves have a substantially L-shaped cross-section with a first limb of the L forming a first channel and a second limb of the L forming a second channel that extends into the recess over a height of the side portion. Preferably the length of the first channel is substantially the same as or shorter than the length of the second channel.

Forming the further venting device in this manner ensures that air present in the concavely shaped central region can be directed away from the concavely shaped central region into a region designed for the venting of the air.

Advantageously the piston, having the medium side and the actuation is configured such that the piston cover is arranged at the medium side and the valve is arranged at a side of the piston cover remote from the medium side and wherein the valve is preferably configured such that it can be actuated from the actuation side; and/or wherein the valve is configured to be actuated by a plunger arranged and/or connectable to the piston and/or the valve at the actuation side.

Providing a piston with an actuation side means that the piston can beneficially be activated from that side. Moreover, the actuation side can also include features in order to activate the valve present in the piston. Preferably the valve is actuated by a plunger which actuates the valve and also lifts the piston cover at least partially from the piston body, so that any air present at the medium side of the piston cover can flow from the medium side onto the side of the piston cover disposed remote from the medium side and out of the valve.

Moreover, providing a medium side which is different from and in particular opposite to the actuation side means that these can be formed e.g. from different materials or in a different manner, so that they are tailored to the specific uses of each side. E.g. the piston cover can be made from a material which is harder than that of the piston body, and which is also less likely to react with the components stored in the cartridge. This, on the one hand, extends the storage life of the piston. On the other hand, the piston body comprising the sealing lip is made from a soft material such as PE (polyethylene) that reliably ensures a seal between the piston and a cartridge wall due to the materials used. This is in particular the case when the piston is a two component injection molded piston.

In a preferred embodiment the outer peripheral surface further comprises at least one sealing element. Such sealing element reliably ensures a seal between a cartridge wall and a piston and thereby facilitate an increased storage life of masses present in a sealed cartridge.

Advantageously the at least one sealing element comprises a sealing lip, an O-ring or a gasket. These sealing element are typical examples of seals that can be used to seal between a piston and a cartridge wall.

In a further preferred embodiment the at least one sealing device is arranged adjacent to the centering portion at an inner region of the outer peripheral surface, and at least one of the sealing element is preferably adjacent to the centering portion; and optionally wherein a boundary of the venting device is preferably directly adjacent to an outer boundary of the at least one sealing element which is adjacent to the centering portion.

The design of the sealing element such that it is arranged adjacent to the centering portion means that less air can be trapped within a cartridge, facilitating an increased storage lifetime of masses present in the cartridge. Moreover, providing a boundary of the venting device such that it is directly adjacent to a boundary of the at least one sealing element ensures that no air bubbles can be captured between a cartridge wall and a piston body thereby ensuring that as little air as possible can be trapped following an installation of a piston into a cartridge.

Preferably the piston cover further comprises a crown, preferably a crown arranged at the center of the concavely shaped central region, with the crown in particular being a convexly shaped crown.

When a convexly shaped crown is arranged at the center of the piston cover, the crown beneficially ensures that the piston cover can be deflected during venting such that the concavely shaped central region is deformed to have a substantially convex shape. This is due to the convexly shaped crown ensuring that at least the central region of the piston cover can be deflected such that it becomes substantially of convex shape. This means that any air previously trapped between the piston cover and a medium stored in a cartridge can flow away from the crown of the piston cover in the direction of the recesses during the venting.

In this connection it should be noted that a piston without the venting device and/or the centering portion but having the crown can also be provided in order to solve the object underlying the present invention. Such a piston has a medium side and an actuation side and the piston further comprises a piston body, preferably having an at least substantially cylindrical outer shape, a piston cover having a crown arranged at its center and the piston cover being adjacent to at least a part of the piston body and a valve arranged within the piston body and adjacent to the piston cover. This means that in this embodiment of the invention, the piston comprises a piston cover having a crown but not necessarily a centering portion arranged at an outer region of an outer peripheral surface of the piston body and not necessarily a venting device provided at the centering portion.

In a further aspect of the invention this relates to a cartridge comprising an outlet, at least one chamber and a piston in accordance with the invention. Such a cartridge has an improved storage lifetime of the masses stored therein due to the improved venting of air present in the cartridge.

It is preferred if a cartridge comprises a respective flowable mass arranged in each of the at least one chambers. Typical dispensing systems have volumes for the flowable masses selected from the range of volumes comprising 2.5 ml, 5 ml, 10 ml, 20 ml, 50 ml and 100 ml, 500 ml and 2500 ml with the volume being a combined volume for both chambers of the cartridge. Thus, in a preferred embodiment the dispensing system has a volume in the range of 1 to 2500 ml, more preferably of 1 to 500 ml.

In a further aspect of the present invention this relates to a method of venting a cartridge in accordance with the invention. The method comprises the steps of:
 placing the piston into the cartridge;
 actuating the valve; and
 effecting a venting of air present in the chamber in a vicinity of the medium side via the at least one venting device, a recess formed in the piston body and the valve.

Venting a cartridge using the aforementioned method one can ensure that air present in the chamber of a cartridge between the component present in the chamber and the piston can be removed in order to ensure a longer storage lifetime of the component present in that chamber.

It is further preferred when the venting of air present in the chamber in the vicinity of the medium side, in particular air present in the region of the concavely shaped central region, is also effected via the further venting means.

BRIEF DESCRIPTION OF THE DRAWINGS

Referring now to the attached drawings which form a part of this original disclosure.

FIG. 1 is an exploded view of the components of a cartridge;

FIG. 2 is a further exploded view of the components of a further cartridge;

FIG. 3A is a view of a piston;

FIG. 3B is a section through the piston of FIG. 3A;

FIGS. 6A-6C are views of a further embodiment of a piston.

DETAILED DESCRIPTION OF THE EMBODIMENTS

Figure 4:
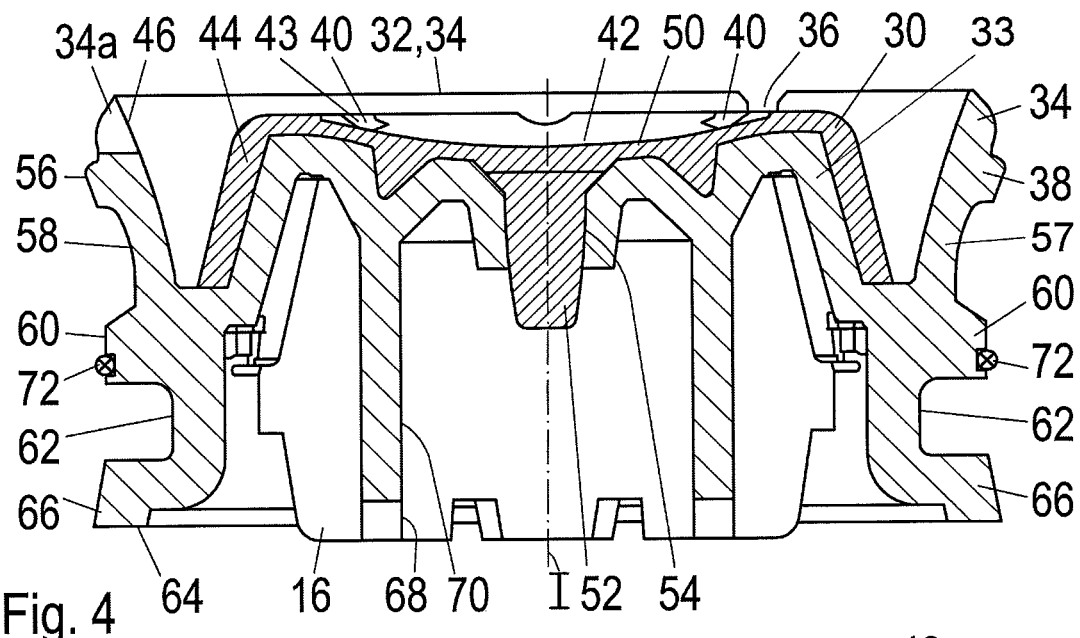
FIG. 4 is a section through a further piston.

Features which have the same or a similar function will be described in the following using the same reference numeral. It is also understood that the description given with respect to reference numerals used in one embodiment also applies to the same reference numerals in connection with other embodiments unless something is stated to the contrary.

FIG. 1 shows a first embodiment of a cartridge 10. The cartridge 10 comprises an outlet 12, two chambers 14a, 14b and two pistons 16a, 16b. The outlet 12 of the cartridge 10 is sealed through the use of a cap mechanism 18. The cap mechanism 18 comprises a cap 20 which is secured to the cartridge 10 by a circlip 22 engaging a sealing plug 24. The outlets 12 are sealed through the use of the sealing plug 24. The cartridge 10 shown in FIG. 1 is a so-called 1:1 cartridge 10.

FIG. 2 shows a further embodiment of a cartridge 10. In contrast to the embodiment of FIG. 1 the cartridge 10 of FIG. 2 shows a so-called 4:1 cartridge 10. This means that a volume of material stored in the first chamber 14b is four times a volume of material stored in the second chamber 14a.

A further difference between the cartridges 10 of FIG. 1 and FIG. 2 is the closure cap 26. The closure cap 26 of FIG. 2 is secured at the cartridge 10 by a so-called bayonet means or device 27, the precise details of the closure cap 26 of FIG. 2 and the bayonet device 27 are disclosed in EP 0 730 913, whose contents is hereby incorporated by reference.

The closure cap 26, the cap mechanism 18 and the ratios of cartridges 10 shown in FIG. 1 and FIG. 2 can be arbitrarily combined, depending on the specific use of the cartridge 10 and/or of the materials to be dispensed using said cartridge 10. Since the volume of the chambers 14a, 14b of the cartridge of FIG. 2 is different, the outer diameter, i.e. the size of the pistons 16a, 16b employed in the chambers 14a, 14b is also different as is clear from FIG. 2.

FIG. 3A shows a schematic view of a piston 16. The piston 16 comprises a generally cylindrically shaped piston body 28 and a piston cover 30. The piston cover 30 covers at least a substantial part of a first end 32 of the piston body 28. The piston body 28 further comprises a centering portion 34 in the form of a circumferentially extending chamfered lip 34a at the first end 32. The lip 34a has three venting slots 36 disposed therein in order to permit a venting of air present between the lip 34a and a chamber wall (not shown) once the piston 16 is installed in the cartridge 10 and a venting process is carried out. A sealing lip or element 38 is disposed beneath the lip 34 which effectively seals between the cartridge 10 and the piston 16 in order to prevent air or the like from entering or exiting the cartridge 10 via the sealing lip 38 of the piston 16.

As can be seen the sealing means or element 38 is adjacent to the centering portion 34. Moreover, a boundary of the venting slots 36 is preferably directly adjacent to a boundary of the at least one sealing element 38 which is adjacent to the centering portion 34. This ensures that the venting means or device 36 are positioned such that air can be reliably vented from the space between the centering lip 34 and the cartridge wall. In the Figure shown, the venting slots 36 have the form of a generally U-shaped valley in a cross-section thereof. Naturally speaking any other kind of shape can be selected for the venting slots 36, such as a V-shaped valley or a simple through bore extending through the centering portion.

On insertion of the piston 16 into the cartridge 10 a centering portion 34, i.e. the chamfered lip 34a, helps to clear material and any particles present at the cartridge wall from the area close to the cartridge wall (this is naturally only the case when the materials include particles).

Moreover, the centering portion 34 also ensures a centering of the piston 16 in the chamber 14 of the cartridge 10, this protects the sealing lip 38 from becoming damaged on the insertion into the chamber 14 and thus avoids leaks in the assembled cartridge 10 arising via the possibly damaged sealing lip 38.

In this connection it should be noted that the piston cover 30 is typically made from a material different from that of the piston body 28. The material of the piston cover 30 may e.g. comprise PE, that of the piston body 28 may e.g. comprise PA (polyamide).

The piston cover 30 has so-called venting grooves 40 and a concavely shaped central region 42 which can be considered to have the shape of a plate. The venting grooves 40 are provided to facilitate the air removal from the concavely shaped central region 42. The venting grooves 40 extend not only generally adjacent to the central region of the piston cover 30, but also project downwardly along a peripherally extending side portion 44 of the piston cover 30 into a recess 46 formed within the piston body 28. Thus, the venting grooves 40 can be considered to have a substantially L-like shape in a cross-section thereof.

The venting grooves 40 of the piston cover 30 of FIG. 3A have a substantially L-shaped cross-section with a first limb of the L forming a first channel 43 and a second limb of the L forming a second channel 45 that extends into the recess 46 over a height of the side portion 44. The length of the first channel 43 is substantially the same as or shorter than the length of the second channel 45.

FIG. 3B shows a section through the piston 16 of FIG. 3A along the sectional line A-A of FIG. 3A. As can be seen, the piston cover 30 extends into the peripherally extending recess 46 of the piston body 28. Moreover, the piston cover 30 has a medium side 50 at the first end 32 of the piston body 28, and on the side of the piston cover 30 remote from the medium side 50 the piston cover 30 has a further side 48. The further side 48 has a shape which is complementary to a substantial part of the shape of the first end 32 of the piston body 28. The piston cover 30 also has a so-called venting pin 52 which forms part of a valve 54 arranged between the piston cover 30 and the piston body 32. The center of the venting pin 52 also forms a longitudinal axis I of the piston 16. The first end 32 of the piston body 28 comprises an inner wall 33 at which at least a part of the piston cover 30 is supported in a non-venting state of the piston 16. Moreover, the second channels 45 of the venting grooves 40 extend through the piston cover in the region of the inner wall 33.

On installation of the piston 16 into the cartridge 10, the venting pin 52 can be actuated and thereby effectively lifts the piston cover 30 off from the piston body 28 and permits an air flow in a space (not shown) then present between the piston cover 30 and the piston body 28 as well as in a region where the second channels 45 are adjacent to the inner wall 33 leading to the space formed between the piston body 28 and the piston cover 30. This then permits a venting from the medium side 50 of the piston 16 out of the cartridge 10 via the valve 54.

During this lifting the concavely shaped central region 42 is deflected and becomes less concave or in some instances even convex. In this case (not shown) a lower boundary of the venting grooves 40 at least substantially lies in or intersects a plane included by the concavely shaped central region 42, at least during a venting action of the piston 16.

The longer a length of the venting pin 52 is selected the further the piston cover 30 can be lifted from the piston body 28. Thereby, the space provided for air to be vented from the cartridge 10 via the piston 16 is enlarged. However, the venting pin 52 is not allowed to be so long that the piston cover 30 can become detached from the piston body 28 in such a way that it cannot be replaced on the piston body 28, such that the valve 54 cannot be closed again.

The piston 16 has an outer peripheral surface 56 formed by a peripherally extending outer wall 57, with the recess 46 being formed between the outer wall 57 and the inner wall 33.

The outer peripheral surface 56 respectively the outer wall 57 of FIG. 3B has a substantially cylindrical outer shape and has the chamfered centering lip 34 at an outer region thereof, with the centering lip 34 being adjacent to the sealing lip 38. The sealing lip 38 is configured to seal the piston 16 with respect to the cartridge 10 once installed therein. Following an outer contour of the outer peripheral surface 56 from the first end 32, a first recess 58 is adjacent to the sealing lip 38. This first recess 58 in turn is adjacent to a first stabilizing projection 60 which is adjacent to a second recess 62. The second end 64 of the piston 16 has a further stabilizing projection 64 adjacent to the second recess 62. The stabilizing projections 60, 64 are disposed at the piston 16 in order to stabilize the piston 16 as this travels along the cartridge wall during a dispensing action. This ensures that the piston 16 travels along the cartridge wall in an as uniform as possible manner.

The piston body 28 comprises an actuation side 68 at the second end 64 thereof. The actuation side 68 is disposed remote from the medium side 50. The actuation side 68 comprises a central recess 70 into which a plunger (not shown) can be introduced in order to actuate the venting pin 52. The actuation side 68 can further be actuated to move the piston 16 in the cartridge to dispense a component present in the cartridge 10 via the outlet 12. The plunger should not engage the valve 54 during a dispensing action, as otherwise a component present in the cartridge 10 could leak out of the cartridge 10 via the actuation 68 of the piston 16 (not shown).

FIG. 4 shows a section through a further piston 16. This piston 16 includes a second sealing means or element 72 which is disposed in the region of the first projection 60 between the first projection 60 and the second recess 62. This second sealing element 72 is provided in the form of an O-ring 72 which peripherally extends about the piston 16. Such sealing O-rings are advantageously used, in order to ensure a continuous seal in particular for larger volumes of cartridge, e.g. cartridges 10 having a volume of greater than 100 ml up to 2000 ml. These O-rings 72 are particularly expedient once the piston 16 has travelled a certain distance in the chamber 14 of the cartridge 10 as they ensure that the piston 16 can travel more securely within such large chambers 14 and still have an adequate seal.

Figure 5A:
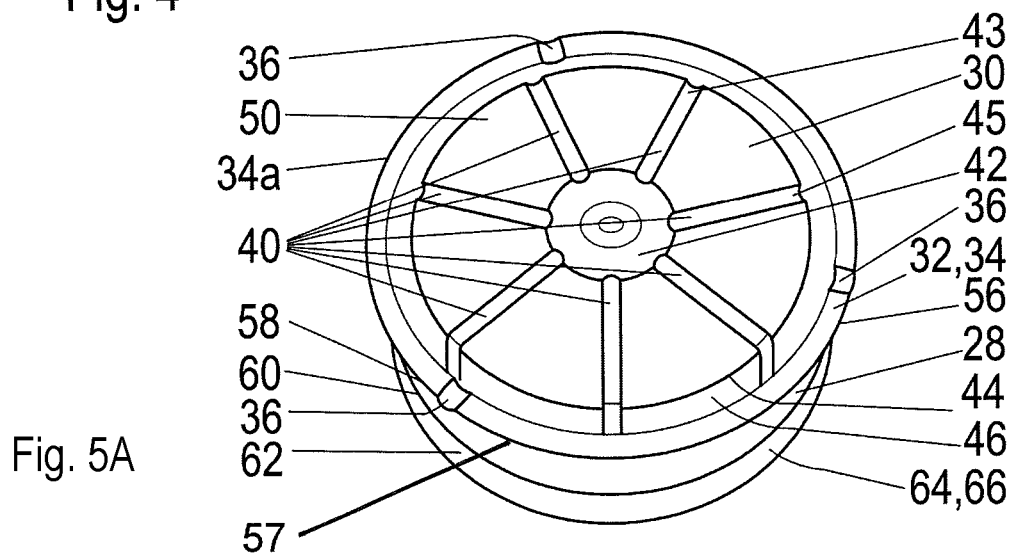
FIGS. 5A-5B are views of a further piston.
Figure 5B:
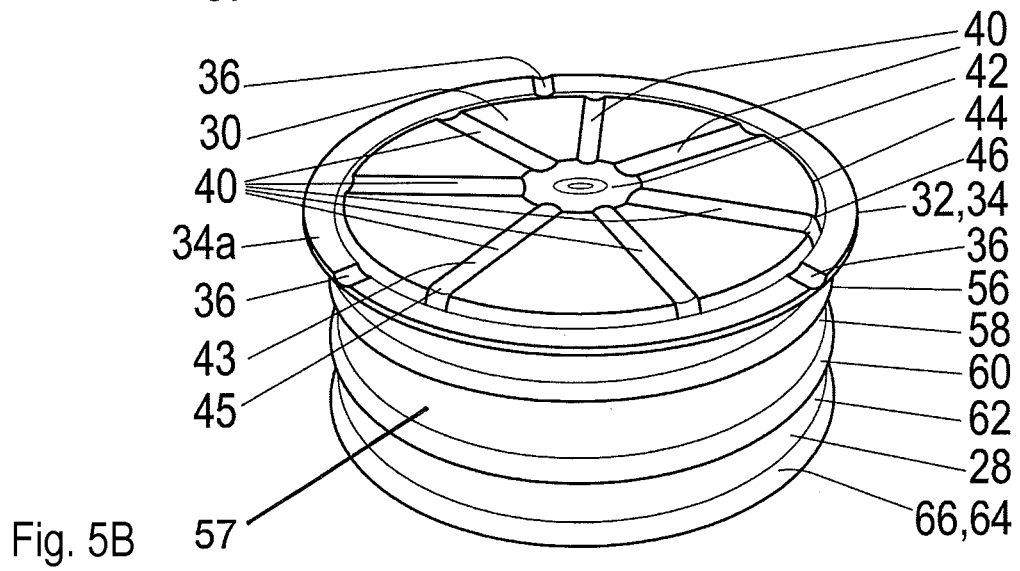

FIGS. 5A and 5B show various views of a further piston 16. The piston cover 30 comprises seven venting grooves 40. These venting grooves 40 are spaced at substantially equal intervals at the piston cover 30. In the present instance the angular interval between adjacent venting grooves 40 amounts to approximately 60 degrees.

In this connection it should be noted that it is preferred if an angular interval between the respective venting grooves 40 is selected in the range of 30° to 120° with respect to the longitudinal axis I. It has been found that this spacing is particularly advantageous for venting applications using a piston 16.

FIG. 5B shows a further view of a piston 16 one can clearly recognize the three venting slots 36 present in the chamfered lip 34a. The intervals between each venting slot 36 are spaced apart by approximately 120 degrees with respect to the longitudinal axis I of the piston 16.

In this connection it should be noted that it is preferred if an angular interval between the respective venting slots 36 is selected in the range of 30° to 180°. It has been found that this spacing is particularly advantageous for venting applications in a piston 16.

FIGS. 6A to 6C show a further piston 16. In contrast to the pistons 16 respectively disclosed in FIGS. 3A to 4, the piston cover 30 of FIGS. 6A to 6C has a generally concavely shaped central region with a convexly shaped crown 74 at its center.

The crown 74 ensures, during a venting of the piston 16, when at least the concavely shaped central region of the piston is deflected, that the concavely shaped central region becomes substantially completely convex in order to permit an improved venting behavior of the piston 16 relative to the piston cover 30.

This is due to the piston cover 30 having a significant thickness in the region of the valve 54. This thickness can prevent the central part of the concavely shaped central region 30 of FIGS. 4A to 4 from being deflected into a substantially convex shape during venting and may therefore lead to air being trapped at a then central concave pocket during a venting of the piston 16. This air pocket is substantially prevented when the piston cover 30 has the shape as disclosed in FIGS. 6A to 6C. FIG. 6B shows a view of the venting device along the line indicated with the arrow at Y and FIG. 6C shows a cross section of the piston 16 along that line.

Although the invention has been described with regard to a two-component system, a cartridge 10 having a single chamber 14 or three or more chambers 14 can naturally also be provided using the piston 16 described herein. It is also possible, that the piston design can also be used in a coaxial cartridge 10. Then the central piston 16 can be configured e.g. as shown in FIGS. 3A and 3B or FIG. 4 and the coaxially extending piston can either be configured in accordance with the prior art or employing a similar mechanism as that described in the foregoing.

In this case a first central piston is provided and is surrounded by an outer co-axial piston when inserted into a co-axial cartridge (not shown). The outer co-axial piston has first and second centering portions. The first centering portion is arranged at a central region of the outer co-axial piston and the second centering portion is arranged at the outer peripheral surface of the outer co-axial piston.

The first centering portion can, but does not have to, also comprise at least one venting device which is configured in the same manner as the venting device of the piston disclosed e.g. in FIGS. 3A to 4. The second centering portion comprises at least one venting device like the piston disclosed e.g. in FIGS. 3A to 4. The co-axial piston in this way, when inserted into a co-axial cartridge, has a through hole which is adapted to receive a central dividing wall of the co-axial cartridge which is e.g. of generally annular shape and which in turn is adapted to receive the central piston.

The piston cover of the outer co-axial piston then extends between the first and second centering portions between first and second recesses and can comprise an annularly extending venting pin. The piston cover of this piston then, in a top view thereof, has the shape of a ring and the concavely shaped central region then also has a ring-like shape in the top view and extends between the first and second centering portions. The valve, in a bottom view of this piston then also has a ring-like shape and can be acted on by a ring-shaped plunger in order to vent the piston.

The invention claimed is:

1. A piston for a cartridge, the piston having a medium side and an actuation side, and comprising:
   a piston body having an outer wall;
   a piston cover arranged adjacent to at least a part of the piston body and having a concavely shaped central region and a side portion;
   a valve arranged within the piston body and adjacent to the piston cover;
   the piston body comprising a centering portion arranged at an outer region of an outer peripheral surface thereof, the centering portion comprising a lip and a plurality of venting slots disposed in the lip, and the lip being arranged at the outer wall of the piston body, the outer wall defining the outer peripheral surface of the piston and the outer wall of the piston comprising the plurality of venting slots, the plurality of venting slots in communication with the valve in a venting state of the piston, such that venting occurs between the medium side and the actuation side via the plurality of venting slots and the valve;
   a sealing lip disposed beneath and adjacent the lip of the centering portion and configured to seal the piston with the cartridge to prevent air from entering or exiting the cartridge; and
   wherein the piston cover comprises a venting groove extending over a length of the side portion arranged adjacent to the concavely shaped central region and which projects into, and towards, the concavely shaped central region as a first channel; and
   further the venting groove has a substantially L-shaped cross-section with a first limb of the L forming the first channel and a second limb of the L forming a second channel that extends into a recess of the piston body over a height of the side portion, and the length of the first channel is substantially the same as or shorter than the length of the second channel.

2. The piston in accordance with claim 1, wherein the lip of the centering portion is chamfered and includes a circumferentially extending inclined surface.

3. The piston in accordance with claim 1, wherein the centering portion has a wall inclined towards a longitudinal axis of the piston.

4. The piston in accordance with claim 1, wherein the outer wall of the piston further comprises at least one of the following members selected from the group comprising: at least one projection and at least one recess.

5. The piston in accordance with claim 4, wherein the plurality of venting slots extend through the outer wall in a region of the centering portion towards an inner wall of the piston, with the plurality of venting slots being disposed in the region of the centering portion comprising a circumferentially extending inclined surface, with the plurality of venting slots permitting a flow communication of air present at the outer peripheral surface of the outer wall towards the inner wall and towards the valve arranged within the piston body such that the flow communication occurs from the outer peripheral surface via the outer wall, the inner wall and the valve.

6. The piston in accordance with claim 4, wherein the plurality of slots are arranged adjacent to the sealing lip which is a part of the outer wall, with each of the plurality of venting slots being a generally U-shaped or V-shaped valley in a cross-section thereof.

7. The piston in accordance with claim 5, wherein the inner wall of the piston is arranged adjacent to the piston cover and a recess is adjacent to the outer wall.

8. The piston in accordance with claim 1, wherein the piston cover comprises a venting pin forming part of the valve, with the venting pin being capable of being moved together with the piston cover relative to the piston body during a venting process.

9. The piston in accordance with claim 1, wherein the plurality of venting slots are distributed at regular intervals around the outer peripheral surface.

10. The piston in accordance with claim 1, wherein the side portion extends into a recess of the piston body and the recess is arranged adjacent to the centering portion.

11. The piston in accordance with claim 1, wherein a side of the piston cover remote from the concavely shaped central region is adapted to the shape of the side of the piston body arranged adjacent to the piston cover.

12. The piston in accordance with claim 1, wherein the piston cover is arranged to cover at least a substantial part of an end of the piston, with the piston cover being arranged adjacent to the centering portion such that the centering portion surrounds the piston cover.

13. The piston in accordance with claim 1, wherein the first channel having a length being larger than a width of the side portion.

14. The piston in accordance with claim 13, wherein at least two further venting grooves are distributed on the piston cover, and the at least two further venting grooves being distributed at regular intervals over a surface of the concavely shaped central region.

15. The piston in accordance with claim 13,
wherein the piston cover is arranged at the medium side and the valve is arranged at a side of the piston cover remote from the medium side, the valve being configured to be actuated from the actuation side,
or
the valve being configured to be actuated by a plunger arranged or connectable to the piston or the valve at the actuation side.

16. The piston in accordance with claim 1, wherein the outer peripheral surface further comprises a sealing element.

17. The piston in accordance with claim 16, wherein the sealing element comprises an O-ring or a gasket.

18. The piston in accordance with claim 16, wherein the sealing element is arranged adjacent to the centering portion at an inner region of the outer peripheral surface, and a boundary of each of the plurality of venting slots is directly adjacent to an outer boundary of the at least one sealing element which is adjacent to the centering portion.

19. The piston in accordance with claim 16, wherein the piston cover further comprises a crown arranged at a center of the concavely shaped central region, the crown being convexly shaped.

20. A cartridge comprising:
an outlet;
at least one chamber; and
a piston in accordance with claim 16.

21. The cartridge in accordance with claim 20, wherein the at least one chamber includes two chambers, and a respective flowable mass is arranged in each of the two chambers.

22. The method of venting a cartridge in accordance with claim 20, comprising:
placing the piston into the cartridge;
actuating the valve; and
effecting a venting of air present in the at least one chamber in a vicinity of the medium side via the at plurality of venting slots, a recess formed in the piston body and the valve.

23. The method in accordance with claim 22, wherein the effecting the venting of air present in the at least one chamber in the vicinity of the medium side, and air present in a concavely shaped central region is also effected via a venting device.

24. The piston in accordance with claim 1, wherein the centering portion defines at least a portion of the outer wall and the plurality of venting slots are configured to vent air to the outside of the outer wall.

* * * * *